S. J. STRID.
HAND BRAKE FOR RAILWAY CARS.
APPLICATION FILED MAR. 10, 1919.
1,403,209. Patented Jan. 10, 1922.
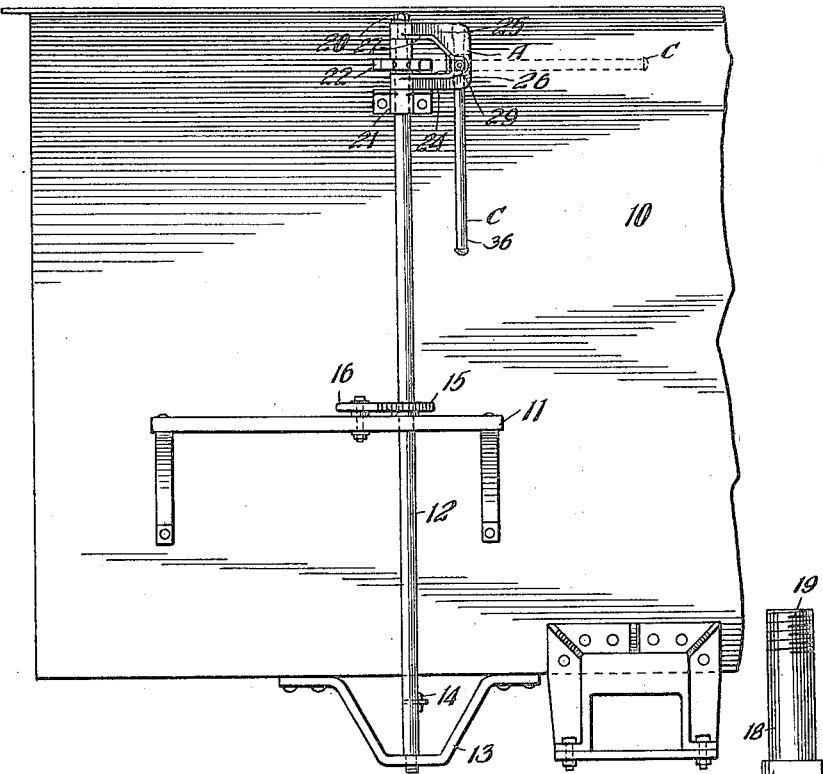
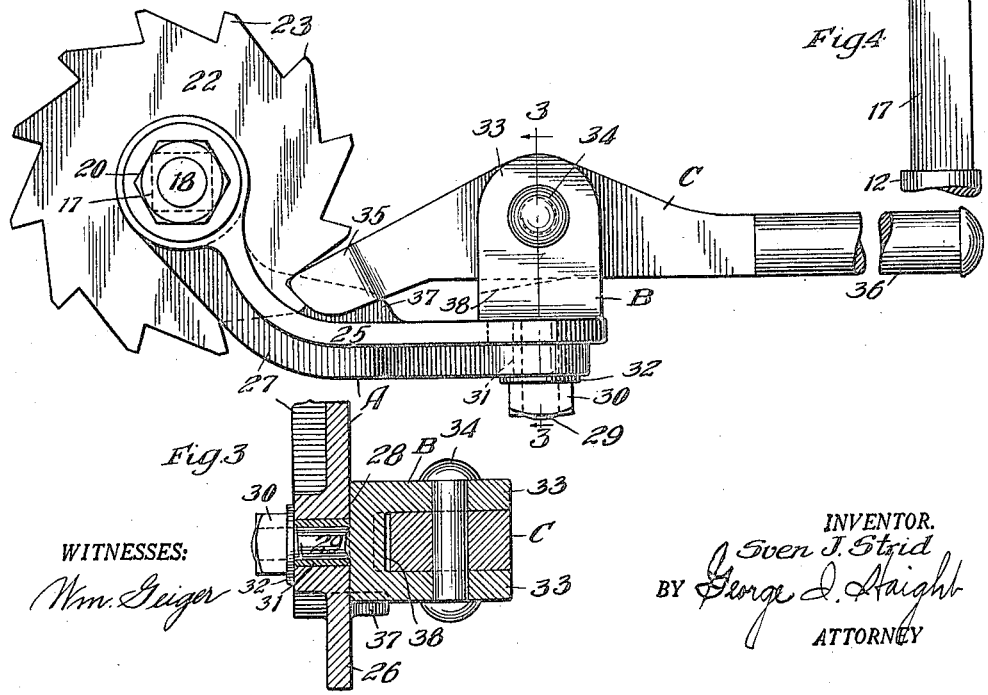
WITNESSES:
Wm. Geiger
INVENTOR.
Sven J. Strid
BY George J. Haight
ATTORNEY

UNITED STATES PATENT OFFICE.

SVEN J. STRID, OF CHICAGO, ILLINOIS, ASSIGNOR TO WILLIAM H. MINER, OF CHAZY, NEW YORK.

HAND BRAKE FOR RAILWAY CARS.

1,403,209.  Specification of Letters Patent.  Patented Jan. 10, 1922.

Application filed March 10, 1919. Serial No. 281,708.

*To all whom it may concern:*

Be it known that I, SVEN J. STRID, a citizen of the United States, residing at Chicago, in the county of Cook and State of Illinois, have invented a certain new and useful Improvement in Hand Brakes for Railway Cars, of which the following is a full, clear, concise, and exact description, reference being had to the accompanying drawings, forming a part of this specification.

This invention relates to improvements in hand brakes for railway cars.

In the operation of railway cars and particularly freight cars, a hand brake is employed to brake the cars when the same are being shunted around in switch yards. The most common form of hand brake employed is that known as the "vertical staff type" having a hand wheel at the top thereof. A ratchet wheel is mounted on the staff and with the ratchet wheel cooperates a locking dog, the latter being ordinarily controlled by the brakeman's foot.

As has been known for some time, the hand wheels are subject to considerable objection on the grounds that the same do not afford sufficient leverage for the brakemen and also are frequent sources of accident and injury to the brakemen. The ordinary practice for brakemen is to employ a heavy stick or club which is inserted between the spokes of the hand wheel, the brakeman grasping some suitable part of the car with his left hand and the end of the inserted stick or club with his right hand. In this manner, the brakeman is enabled to obtain a greater leverage than is possible with the hand wheel and at the same time is better enabled to hold on. This expedient, however, requires the brakeman to shift the club or stick on the wheel several times during the application of the brake and there is, of course, constant danger of the stick slipping and thereby causing the brakeman to lose his balance and be thrown under the moving cars.

One object of my invention is to provide an extremely simple and inexpensive ratchet mechanism for attachment to the ordinary vertical staff type of hand brakes and which will give the brakeman the desired leverage and at the same time permit him to obtain a hold on the car and operate the brake in the accustomed manner.

Another object of the invention is to provide a hand brake operating device wherein is employed a gravity drop operating handle having a pawl associated therewith, the pawl and handle being so mounted that, when the handle drops under the influence of gravity to a depending position, the pawl is simultaneously thrown out of engagement with the ratchet wheel.

Another and more specific object of the invention is to provide in a ratchet hand brake mechanism, a unitary pawl and operating lever so mounted that said pawl and operating lever will automatically move to an inoperative position under the influence of gravity when released by the brakeman and when in operative position, the pawl and lever will function in the usual manner of a pivoted ratcheting pawl.

In the drawing forming a part of this specification, Figure 1 is an end elevational view of a portion of a gondola freight car showing my improvements in connection therewith. Fig. 2 is an enlarged top plan view of the improved brake and showing the pawl-lever in horizontal operating position. Fig. 3 is a detail, sectional view, taken substantially on the line 3—3 of Fig. 2. And Fig. 4 is a detail view of the construction of the upper end of the brake staff when used with my improvements.

In said drawing, 10 denotes the end wall of a gondola car, 11 the usual brakeman's platform, 12 a vertical brake staff, 13 the usual stirrup at the bottom of the car to form a support and bearing for the lower end of the staff, and 14 the end of the brake chain attached to the staff. The staff 12 is provided with a ratchet wheel 15 adjacent the platform 11 and with the ratchet wheel cooperates a foot-controlled locking dog 16 in the usual manner. All of the parts described in the preceding paragraph are of well known form and such as are most commonly found on cars now in service.

In carrying out my invention, the brake staff 12 is provided near the top thereof with a squared section 17 and above the latter a rounded section 18, the rounded section 18 being preferably threaded at its extreme upper end as indicated at 19 to receive a securing nut 20. A suitable bearing for the upper end of the staff 12 is provided by the bracket indicated at 21 secured to the car wall as is customary. Non-rotatably mounted on the squared section 17 of the staff is a preferably cast ratchet wheel 22 having a series of peripheral ratchet teeth 23. Straddling the ratchet wheel 22 is a hanger indicated generally by the reference A. As will be appreciated by those skilled in the art, the hanger A may take any one of a great variety of forms, the one shown in the drawing being merely illustrative and the term "hanger" used herein generically to include such modification. As shown, said hanger A is of substantially U-shape and embodies a lower arm 24, an upper arm 25, and a vertical member 26. The lower arm 24 is perforated and loosely rotatably mounted on the round portion of the staff immediately below the squared section 17 thereof. The upper arm 25 is correspondingly perforated and is loosely rotatably mounted on the rounded section 18 of the staff. In this manner, it is obvious that the hanger A is free to oscillate about the staff 12 while the ratchet wheel rotates in unison with the latter. The arms of the hanger A are preferably formed with the contour shown most clearly in the top plan view thereof in Fig. 2, that is, the arms extending for a distance in a substantially radial direction from the staff and then extending at an angle to the radial portions. The arms are suitably braced by ribs indicated at 27.

Pivotally mounted on the vertical member 26 of the hanger A and about a horizontal axis or pivot in the plane of the ratchet wheel 22, is a pawl-lever support indicated generally by the reference B. Said support B has a flat shouldered face 28 which bears against the face of the section 26 of the hanger and has also a horizontally extending stud 29 passing through the hanger and threaded to receive a nut 30. The stud 29 will preferably be riveted over the nut 30 so as to prevent the latter from coming off. In actual practice, the stud 29 will pass through a bushing 31 mounted in a suitable perforation in the hanger and a washer 32 interposed between the bushing 31 and nut 30. The bushing 31 will be made slightly longer than the thickness of that portion of the hanger through which it passes so that the nut 30 may be tigtened down against the bushing and at the same time leave the support B in a condition to rotate freely about its horizontally extending pivot.

The support B is provided with a pair of forked arms 33—33 between which is pivotally mounted on a rivet 34 the combined operating lever and pawl designated generally by the reference C.

Said pawl-lever C is shown in the drawing as formed of a single member and has a pawl proper 35 at its inner or upper end (depending upon the position of the pawl-lever C) and on the opposite side of the pivot 34 is provided with a handle proper 36.

Normally, the pawl-lever C will hang in a vertical position under the influence of gravity as shown by the full lines in Fig. 1 and consequently, after having been released by the brakeman, when the brakes are released by kicking out the locking dog 16, there will be no danger of the lever being thrown around to strike and injure the brakeman. When the brakes are to be applied, the brakeman merely lifts the pawl-lever C to a horizontal position as indicated by the dotted lines in Fig. 1 and by the full lines in Fig. 2, and in order to prevent the pawl-lever C from being swung above a horizontal operating position, the lower arm 24 of the hanger A is preferably provided with a shelf or ledge 37 to engage the under side of the pawl proper 35 and hold it in the plane of the ratchet wheel 22. With the pawl-lever C in horizontal operative position, it is evident that the brakeman will pull the same toward him in a clockwise direction as viewed in Fig. 2, which is the ordinary direction employed in setting the brakes. Having imparted a partial rotation to the ratchet wheel 22 and staff 12, the brakeman then moves the pawl-lever C in a reverse direction during which the pawl 35 will slip over the ratchet teeth 23 since the pawl-lever C is pivotally mounted on the support B. The interior of the support B may be beveled as indicated at 38 to permit the free oscillation of the pawl-lever C about the pivot 34.

From the preceding description, it will be seen that the arrangement which I have provided is exceedingly simple, comprises a minimum number of parts, affords the necessary leverage, permits the brakeman to apply the brakes in the manner to which he is best accustomed, requires the use of only one hand in directly applying the brakes, and the arrangement is such that it may be applied to the usual brake staffs now in service by merely taking off the usual hand wheel and re-forming the upper end of the staff and thereby permitting the application at a minimum expense to the railroads.

Although I have herein shown and described what I now consider the preferred manner of carrying out the invention, the same is merely illustrative and I contemplate all changes and modifications that come within the scope of the claims appended hereto.

I claim:

1. In a hand brake for railway cars and the like, the combination with a vertical brake staff having a ratchet wheel thereon; of a hanger loosely rotatably mounted with respect to said staff and having a portion located horizontally opposite the ratchet wheel; a supporting member pivotally mounted on said hanger about a horizontal axis in the plane of the ratchet wheel; and a combined pawl and drop handle pivotally mounted on said supporting member to oscillate about an axis at right angles to said first named axis.

2. In a brake for railway cars, the combination with a vertical brake staff having a ratchet wheel thereon; of a loop shaped hanger oscillatably mounted on said staff and straddling said ratchet wheel, the arms of said hanger having bearings on said staff above and below the ratchet wheel respectively; a supporting member pivotally mounted on the intermediate portion of said loop hanger to swing about a horizontal axis; and a combined pawl and drop handle pivotally mounted on said supporting member to oscillate about an axis at right angles to the first named axis.

3. In a brake for railway cars, the combination with a vertical brake staff, having a ratchet wheel thereon; of a hanger loosely oscillatably mounted on the said staff and having a portion thereof extended outwardly beyond the ratchet wheel; a supporting member pivotally mounted on said hanger about a horizontal axis, said supporting member being forked; and a combined pawl and drop handle pivotally mounted between the branches of said forked supporting member to oscillate about an axis at right angles to the first named axis.

4. In a hand brake for railway cars and the like, the combination with a vertical brake staff having a ratchet wheel thereon; of a hanger loosely rotatably mounted with respect to said staff and having a portion located horizontally opposite the ratchet wheel; a supporting member pivotally mounted on said hanger about a horizontal axis in the plane of the ratchet wheel; a combined pawl and drop handle pivotally mounted on said supporting member to oscillate about an axis at right angles to said first named axis; and a horizontally disposed shoulder on said hanger with which the pawl is adapted to engage to limit the swinging movement of the combined pawl and drop handle to operative position.

In witness that I claim the foregoing I have hereunto subscribed my name this 25th day of Feb., 1919.

SVEN J. STRID.